FIG. 7.
FIG. 8.
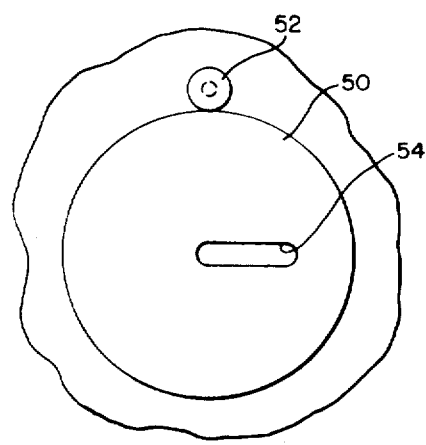
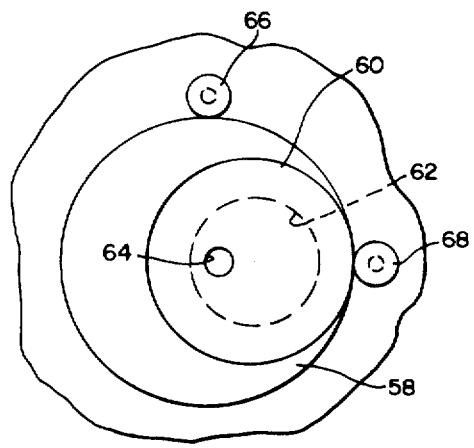
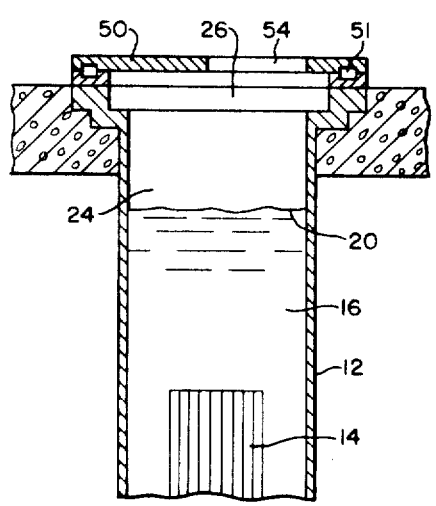
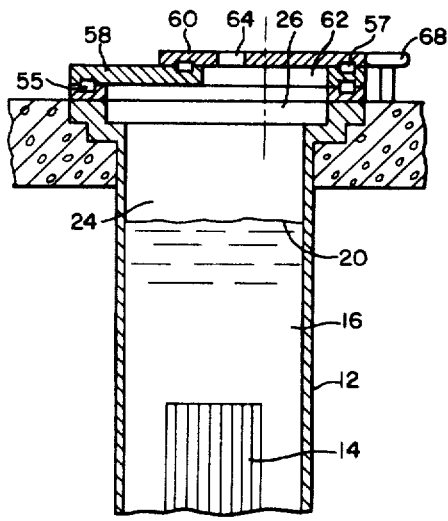
FIG. 5.
FIG. 6.

United States Patent Office 3,437,558
Patented Apr. 8, 1969

3,437,558
NUCLEAR REACTOR AND REFUELING
CELL ARRANGEMENT
William E. Gunson and John D. Sutherland, Monroeville, and Stephen N. Tower, Murrysville, Pa., assignors to Westinghouse Electric Corporation, Pittsburgh, Pa., a corporation of Pennsylvania
Filed Apr. 7, 1967, Ser. No. 629,153
Int. Cl. G21c 19/22
U.S. Cl. 176—52                                    6 Claims

ABSTRACT OF THE DISCLOSURE

The various systems of this invention are operative to substantially eliminate the contamination of refueling cells in liquid metal cooled reactors by liquid metal vapor (such as sodium) and fission products contained therein when the vessel containing the liquid is opened for refueling or maintenance purposes. Gas flow devices, mechanical devices, and condensing devices or combinations thereof are situated in the general area of the channel connecting the reactor vessel with the refueling cell. The gas flow devices set up a flow pattern which allows collection of the liquid metal vapor before it reaches the fuel cell to radioactively contaminate the same. The mechanical devices limit the area through which thet vapors have access to the refueling cell, and the condensing devices cause the liquid metal vapor to freeze before it can reach the cell area.

Background of the invention

This invention relates generally to liquid metal cooled reactors and more particularly to the containment of liquid metal vapors emanating from the reactor coolant when the reactor vessel is opened during refueling or other maintenance of such reactors.

Prior art liquid metal reactors made no adequate provision for limiting contamination of the environment and the walls of the reactor vessel container when the reactor vessel is opened. Upon opening or removal of the shield plug or cover of the reactor vessel, vaporized portions of the liquid metal coolant will be exposed to the chamber containing the reactor vessel. Such vapor will normally fill the chamber and will condense on substantially all relatively cooler surfaces to which the same is exposed. The liquid metal vapor may contain some fission fragments and radioactive particles due to exposure of the fuel material to the coolant and the condensation thereof will cause the chamber to remain radioactive even after the reactor vessel has been closed. Thus access to the chamber for maintenance purposes, i.e., contact maintenance, cannot occur until the level of radioactivity therein has been substantially reduced. In order to protect personnel from contamination, admission is impossible during actual refueling. How long after refueling admission must be considered unsafe depends primarily upon the level of contamination. This time period must, of course, be longer where no provisions are made to limit the level of contamination as in the case of prior art systems.

Moreover, the liquid metal vapor can cause mechanical and electrical malfunctions, and can coat the various viewing windows and cameras such that external inspection is rendered impossible.

Summary of the invention

This invention provides several means for limiting contamination of the refueling cell or vessel chamber of a liquid metal cooled reactor utilizing the hot cell refueling technique. The systems of this invention reduce contamination of the refueling cell and thereby increase maintainability of the reactor system. Devices within the scope of this invention comprise gas flow means, mechanical shield means, condensing means, and various combinations thereof.

Refueling of such reactors presents problems not encountered with other types of coolants. Sodium, for example, is solid at room temperature, reacts with oxygen and water, and becomes radioactive under neutron irradiation. One method for dealing with the problem of using sodium as a coolant comprises: constructing a refueling cell over the reactor vessel and shielding the refueling cell from the reactor vessel. The refueling cell itself is filled with an inert gas and refueling operations are carried out from inside the cell using remotely operated equipment. However, during the refueling operation the reactor shield or cover must be removed so that the refueling machine may have access to the reactor core. As a result the cover gas, which generally comprises an inert shielding gas contaminated with liquid metal vapor within the reactor vessel, is exposed and will flow into the refueling cell atmosphere. Inasmuch as sodium, for example, can freeze at temperatures below 208° F., the sodium vapor will generally condense on the walls of the refueling cell and render it radioactive.

In the gas flow means of this invention, a system has been designed to cooperate with the recirculating system of the refueling cell to produce a gas curtain effect which will prohibit the upward flow of sodium vapor. A gas flow pattern is created which effectively isolates the refueling cell atmosphere from the cover gas. In these gas flow systems the gas curtain can be kept at a higher temperature than that of the liquid pool thereby creating an inversion layer and preventing the rise of liquid metal vapor.

Mechanical means may also be used, either separately or in conjunction with the gas flow system. These mechanical means essentially serve to limit the area through which the sodium vapor may pass upwardly from the nuclear vessel into the refueling cell. A cover with a single movable hole is effective as would be several covers arranged vertically and having holes so situated that they cooperate to allow flexibility of access of the refueling machine but leave only a small area through which the vapor may flow.

Further, a refrigerated condensing ring may be used to lower the sodium vapor 208° F., in which range it will tend to freeze, and thereby condense on the refrigerated surface or fall back into the reactor vessel.

While personnel admission to the refueling cell is not possible during actual refueling when the shield plug is removed, it is desirable to perform contact maintenance at times when the shield plugs are in place. The various devices of this invention may be utilized to minimize the time delay after the shield plugs are replaced before such maintenance is possible, and to reduce the need for maintenance.

Description of the drawings

For a better understanding of the invention, reference may be had to the accompanying drawings, in which:

FIG. 5 is a cross-sectional view of a rotating cover arrangement;

FIG. 6 is similar to FIG. 5 but shows a double rotating cover arrangement;

FIG. 7 is a top plan view of the embodiment of FIG. 5;

FIG. 8 is a top plan view of the embodiment of FIG. 6; and

*Description of the embodiments*

Figure 1:
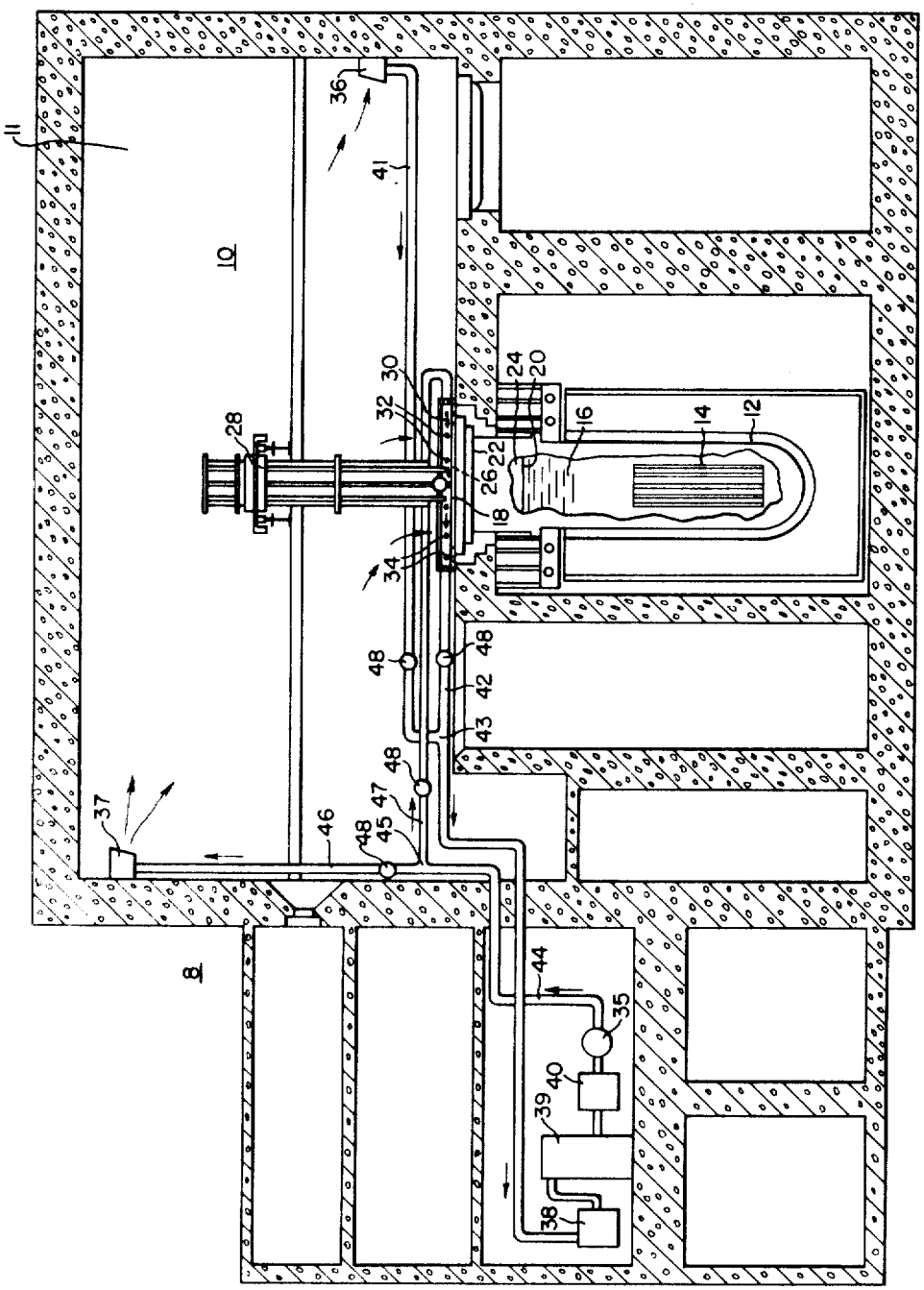
FIGURE 1 comprises a cross-sectional view showing a liquid metal cooled reactor utilizing a refueling cell system and including a gas curtain cross-flow system illustrating one embodiment of this invention.

Referring now to the embodiment of this invention of FIGURE 1, there is shown a portion of a nuclear reactor containment system identified by the reference character 8. The containment system 8 includes a number of wall sections formed from a suitable structural material such as reinforced concrete which provides a number of separate chambers, one of which comprises a refueling chamber or cell 10 which is located above and in juxtaposition with a reactor vessel 12. The reactor vessel 12 contains a reactor core 14 and a liquid metal coolant, for example liquid sodium, indicated by the numeral 16. (The term liquid sodium refers to sodium at a temperature above 208° F.) At its upward end, the reactor vessel is closed by a removable cover means such as a shield plug 18 located between the vessel 12 and cell 10. Between the upper surface 20 of the liquid metal and the bottom surface 22 of the removable shield plug 18, there is provided a cover gas space generally containing an inert gas indicated by the numeral 24. Argon may be deemed to be a suitable cover gas for a sodium cooled reactor. In addition, the refueling cells may also be filled with a suitable gas, such as argon. When the shield plug 18 is removed, an access channel indicated generally by the numeral 26 is created through which the sodium vapor has access to the interior or refueling cell. For purposes of clarity, the access channel 26 may be defined as that space normally occupied by the shield plug. The removal of the shield plug 18 is necessary for refueling the reactor core 14 and refueling machine 28 is used for removing and replacing fuel assemblies of core 14.

A number of problems exist when utilizing liquid metal as a coolant. In particular, liquid sodium becomes radioactive under neutron irradiation. As mentioned, when the shield plug 18 is removed the tendency is for the cover gas 24 to migrate through the access channel 26 into the refueling cell 10 and to freeze or solidify on the walls of the refueling cell thus rendering the cell radioactive. Although personnel admission to the refueling cell is not possible during actual refueling, it is sometimes desirable for contact maintenance to be performed when the shield plug is in place. Whether or not personnel may swiftly enter the refueling cell after the shield plug is replaced depends upon the amount of radioactivity resulting from vapor fallout on the surfaces of the refueling cell.

In order to facilitate early personnel entry into the refueling cell, a gas curtain 30 is created by a gas flow pattern generated in the region just above the access channel 26 which effectively isolates the inert gas refueling cell atmosphere 11 from the reactor cover gas 24 and from any sodium vapor mixed therewith. Gas distributors 32 and gas collectors 34 cooperate to produce the curtain 30. These devices, in turn, cooperate with the closed loop recirculating system of the refueling cell, as will be described. The gas curtain may be kept at a higher temperature than that of the liquid metal pool thus creating an inversion layer which further prevents the rise of sodium vapor. Although the gas distributors and gas collectors of FIGURE 1 are shown at the upward mouth of the access channel 26 it is obvious that they may be effectively situated anywhere within the area of the access channel, i.e., within the access channel, slightly above the channel as in FIG. 1, or below the access channel within the reactor vessel.

A source of negative pressure is created by suitable means such as by a blower 35 on the upstream side thereof, which draws the cover gas 24 into collector 34 and the inert gas atmosphere 11 of the refueling cell into an outlet 36, and a source of positive pressure is created on the downstream side of blower 35 which blows substantially inert gas from the distributors 32 and from refueling cell inlets 37. Both the cover gas 24 and the refueling cell atmosphere 11 are passed through a cooler 38, a purifier 39, and a filter 40 before being returned to their respective distributors 32 and inlets 37 in order that only substantially inert gas is distributed to the system.

The refueling cell atmosphere 11, exiting through a plurality of conduits 41, is caused to mix with the cover gas 24, exiting through a plurality of conduits 42, at one or more junctions 43 before being passed into the purification system (cooler 38, purifier 39, and filter 40).

The gas reentering the systems through a conduit 44 is split at one or more junctions 45 into a plurality of conduits 46 and 47 in order that it may be conveyed to inlets 37 and distributors 32, respectively.

Valves 48 may be placed on the various conduits to facilitate obtaining the most efficient flow ratios and pressures throughout the system.

Inasmuch as a recirculating and purification system are necessary for the refueling cell atmosphere, it can be seen that the effective cover gas collection system of this invention is provided with little additional structure.

Figure 2:
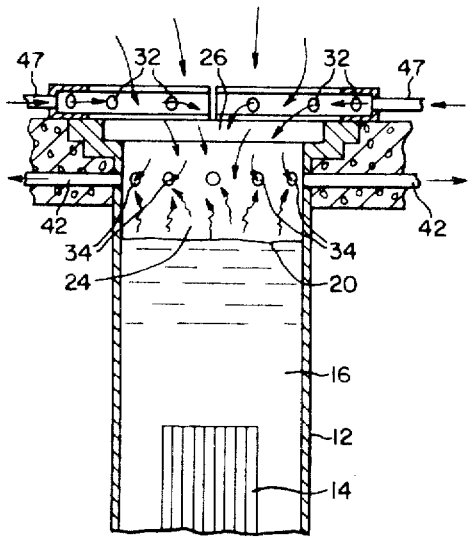
FIG. 2 is a schematic view of gas curtain downflow system similar to the system shown in FIG. 1 and illustraing another embodiment of this invention.

FIGURE 2 shows a variation of the system of FIGURE 1. It will be noted that like parts in FIG. 2 will be designated by the same reference characters used in FIG. 1 and will not be described in detail again. In FIGURE 2 the gas distributors identified by the numeral 32 are situated at the mouth of the access channel, as in FIGURE 1, but the gas collectors 42 are situated above the liquid metal level 20 within the reactor vessel 12 itself. In this case, the gas curtain is produced by a downflow of gas into the reactor vessel and out through the reactor vessel sides into the gas collector manifold. Here also, as in all the disclosed gas flow systems described herein, the inversion layer technique may be utilized.

Figure 3:
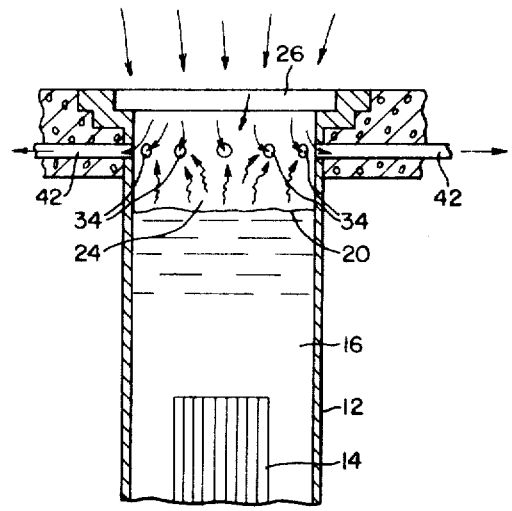
FIG. 3 is a schematic view of another embodiment of this invention.

FIGURE 3 shows a system very similar to that of FIGURE 2 except that the gas distributors 32 are omitted and the refueling cell atmosphere itself is drawn into collectors 34 to produce the gas curtain which prohibits the upward flow of the cover gas. All of the gas exiting from the purification system is, of course, returned to the refueling cell through inlets 37.

Figure 4:
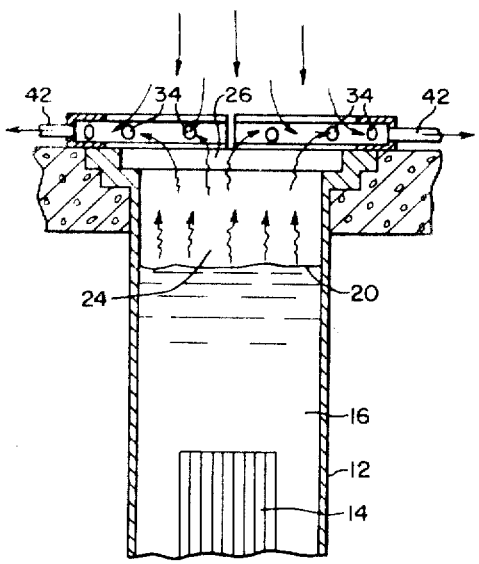
FIG. 4 is similar to FIG. 3 but shows a different placement of the gas collectors.

FIGURE 4 shows a system substantially the same as that of FIGURE 3 with the exception that the gas collectors are situated at the mouth of the access channel 26 instead of within the reactor vessel.

The arrangements of FIGURES 3 and 4 show two illustrative positions of the gas collectors of this invention. Obviously, positions other than those shown in these figures may be utilized to produce the desired effect.

Referring now to FIGURE 5, there is illustrated a mechanical device which is utilized to minimize the flow of the reactor cover gas into the fuel cell 10. Here, a cover 50 is shown which is capable of being rotated on its support bearings 51 by driving unit 52. This cover 50 may be placed over the top of the reactor. An access slot 54 is left in the cover 50 so that the refueling machine 28 has access to the reactor core 14. The slot 54 is utilized to decrease the area through which the cover gas may pass into the refueling cell 10.

A modification of the cover arrangement of FIG. 5 is shown in FIGURE 6. Two rotating covers are employed, a lower cover 58 which contains a generally cylindrical hole or access port 62 of rather large dimensions and an upward cover 60 which contains a smaller hole 64. Here, two drive units 66 and 68 are provided for rotating, respectively, the lower cover 58 and the upper cover 60. The double rotating cover scheme serves to further limit the area through which the reactor cover gas may flow into the fuel cell 10. The lower cover 58 is supported on bearings 55, and the upper cover is supported on bearings 57.

As can be seen in FIG. 8, the hole 64 in the upper cover 60 is so situated that rotation of this cover by driving means 68 can vary the radial distance from the center line of the pressure vessel 12, as shown in FIG. 8, to a position near the periphery of vessel 12.

While the lower cover 58 is in the position shown in FIG. 8, the upper cover 60 is rotated to a selected radial distance from the center line of the reactor. The lower cover 60 is then rotated to place the matching holes over the core position desired.

Figure 9:
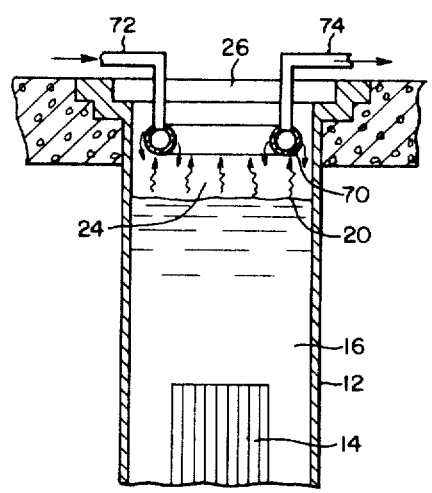
FIG. 9 comprises a schematic view showing a condensing ring system for limiting liquid metal vapor contamination.

In FIGURE 9, one or more condensing means 70 may be placed in the area of the access channel 26 with only one condensing means 70 being shown. The condensing surface or condensing means 70, as shown, has a refrigerant passing therethrough. The refrigerant enters the means 70 through a conduit 72 and exits through a conduit 74 from which it proceeds to cooling and condensing means (not shown) desirably located in a separate room much in the manner of the embodiment of FIG. 1. This causes the liquid metal vapor and other fission products to either condense on the means itself or drop back into the pool, and therefore minimize the quantity escaping into the refueling cell 10.

It will therefore be apparent that there has been disclosed various systems which serve to limit the passage of vapor from the reactor vessel into the refueling cell and which will allow contact maintenance with far fewer delays than would otherwise occur. While there has been shown and described what are at present considered to be preferred embodiments of the invention, modifications thereto, within the scope of this invention, will readily occur to those skilled in the art. In particular, combinations of the above devices might well be used, such as a mechanical cover in combination with the gas flow system. It is not desired, therefore, that the invention be limited to the specific arrangement shown and described. Rather the specific embodiments of this invention are specifically intended as illustrative of this invention rather than as limitive thereof. It is intended to cover in the claims all such modifications as fall within the true spirit and scope of the invention.

We claim:

1. A nuclear reactor system including, in combination, a reactor vessel having a nuclear core therein, a shield plug of approximately the same peripheral dimensions as said nuclear core normally closing said reactor vessel, said reactor vessel further containing a liquid metal coolant and the vapor thereof, a refueling cell having a refueling mechanism therein, a relatively wide access channel connecting said reactor vessel and said refueling cell when said shield plug is removed whereby said refueling mechanism has access to said reactor core, circulation means for producing a continuous flow of fluid in close proximity with the access channel, and conduction means having a portion thereof situated in close proximity with said access channel for conveying said fluid from the region of said access channel thereby limiting the passage of said liquid metal vapor from said reactor vessel into said refueling cell through said access channel when said shield plug is removed.

2. The nuclear reactor system of claim 1 wherein the temperature of said continuous flow of fluid is higher than that of the said liquid metal vapor whereby an inversion layer is formed further limiting the passage of said liquid metal vapor.

3. The nuclear reactor system of claim 1 wherein said conduction means comprise a gas collector, said gas collector comprising a source of negative pressure, a channel, said channel having one end connected to said source of negative pressure, and the other end having an opening in the area of the access channel whereby a fluid flow pattern is created which effectively isolates the refueling cell atmosphere from the reactor cover gas.

4. The nuclear reactor system of claim 3 including a gas distributor, said gas distributor comprising a source of positive pressure, a channel, said channel having one end connected to said source of positive pressure, and the other end having an opening in the area of the access channel whereby said gas flow pattern is further facilitated.

5. The nuclear reactor system of claim 4 further including inlet and outlet conduits within said refueling cell atmosphere, a gas purification system communicably coupled with said outlet conduits, said inlet and outlet conduits being communicably coupled with said gas distributor channels and said gas collector channels.

6. The nuclear reactor system of claim 1 wherein said circulation means includes a condensing surface through which the fluid circulates, and means for cooling said fluid are communicably coupled to said conduction means whereby said liquid metal vapor is caused to freeze before it reaches the refueling cell.

References Cited

UNITED STATES PATENTS 3,179,266    4/1965    Lemesle et al. _____ 176—30

FOREIGN PATENTS 727,750    2/1966    Canada.

OTHER REFERENCES

Problems in Nuclear Engineering, vol. I, 1957, pp. 267–277 by McLain et al.

BENJAMIN R. PADGETT, *Primary Examiner.*

H. E. BEHREND, *Assistant Examiner.*

U.S. Cl. X.R.

176—30